Patented Feb. 20, 1951

2,542,062

UNITED STATES PATENT OFFICE 2,542,062

ETHER-ESTERS OF DIHYDROXYSTEARIC ACID

Daniel Swern, Philadelphia, Pa., assignor to the United States of America as represented by the Secretary of Agriculture No Drawing. Application January 16, 1948, Serial No. 2,796

4 Claims. (Cl. 260—410.9)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to ether-esters of long chain hydroxycarboxylic acids, more particularly to ether-esters of 9.10-dihydroxystearic acid, and has among its objects the provision of such ether-esters and processes for their preparation.

I have found that compounds corresponding to the general formula:

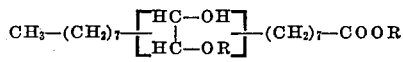

wherein R is an alkyl, alkenyl, or aryl radical, preferably an alkenyl radical such as an allyl group either unsubstituted or substituted with alkyl or halogen, can be obtained by reacting 9,10-epoxystearic acid with an organic hydroxy compound according to the following equation wherein R has the above-stated significance:

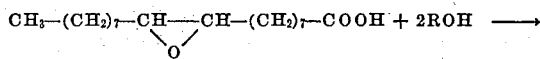

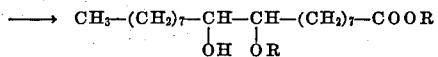

and

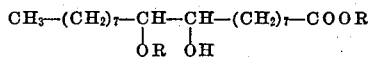

In practicing the process of my invention, 9,10-epoxystearic acid is reacted with the hydroxy compound by heating a mixture of the reactants, preferably in the presence of an esterification catalyst, at reaction temperature for a length of time sufficient to bring the reaction to completion. On completion of the reaction, the resulting ether-esters of 9,10-dihydroxystearic acid, which contain the ether group linked to the ninth or the tenth carbon atom, are recovered from the reaction mixture by any suitable means, as for example, by distillation and/or solvent extraction.

Although the process is operative in the absence of any catalytic agent, the rate of reaction is greatly accelerated by the presence of a catalyst. Suitable catalysts include, for example, acidic catalysts such as sulfuric acid, hydrogen chloride, benzenesulfonic acid, toluenesulfonic acids, naphthalenesulfonic acids, such as naphthalene-2-sulfonic acid, and similar esterification catalysts. Alkaline catalysts, such as metal alcoholates, may also be used although they are usually less effective than acidic catalysts.

Hydroxy compounds suitable for use in the production of ether-esters by the method of my invention include saturated aliphatic alcohols such as methyl, ethyl, propyl, butyl, hexyl, heptyl, octyl, lauryl and octadecyl alcohols, the alkyl radical of which may contain either a normal or a branched carbon atom chain; olefinic monounsaturated alcohols such as allyl alcohols like unsubstituted allyl alcohol, chloroallyl alcohols, and butenyl alcohols like methallyl alcohols and other alkyl substituted allyl alcohols; and aromatic hydroxy compounds, for example, phenol, cresols, and the like.

The products of this invention are relatively stable, high boiling, water insoluble compounds which are useful as lubricants, plasticizers and modifiers for plastic compositions, addition agents for lubricants, pour point depressants and viscosity index improvers, components of synthetic plastic materials, and chemical intermediates.

The following examples illustrate the invention:

Example I 29.9 g. of 9,10-epoxystearic acid were dissolved in 120 ml. of methanol, with gentle heating. The solution was cooled below 30° C. and 0.3 g. of 95% sulfuric acid added with agitation. The mixture was heated on a steam bath for two hours and a quantity of sodium bicarbonate equivalent to the sulfuric acid was then added. The reaction mixture was fractionally distilled, first at atmospheric pressure to recover unreacted methanol and then under vacuum to isolate the ether-ester. The latter was dissolved in acetone, using 2 to 3 ml. of solvent per gram of solute, and the solution cooled to about —20° C. to precipitate the methyl ester of 9,10-dihydroxystearic acid formed in small amount as a by-product of the reaction. The precipitate was removed by filtration and discarded and the solvent was evaporated from the filtrate. The residual oil consisted of almost pure methyl 9,10(10,9)-methoxyhydroxystearate which on redistillation yielded a product having the following characteristics:

Boiling range: 186° to 189° C. at 0.7 to 1.1 mm.
Saponification equivalent: 344.7
Molecular refraction: 99.5
$n_D^{30} = 1.4500$
$d_4^{30} = 0.9306$

Example II 15 g. (0.05 mole) of 9,10-epoxystearic acid were dissolved in 149 g. (0.55 mole) of n-octadecanol by warming to 60° to 65° C., and 0.15 g. of 95% sulfuric acid were added dropwise. The reaction mixture was heated on the steam bath for two hours, and after cooling to room temperature, was dissolved in ether. The ether solution was washed with water until free of sulfuric acid and evaporated to dryness. The residue was dissolved in acetone (10 ml. per gram) and the solution cooled to about 0° C. to precipitate unreacted octadecanol which was separated by filtration. On evaporation of the acetone from the filtrate, 14.5 g. of a low-melting solid, consisting essentially of n-octadecyl-9,10(10,9)-octadecoxyhydroxystearate, were obtained.

Example III 47 g. (0.5 mole) of phenol were reacted with 15 g. (0.05 mole) of 9,10-epoxystearic acid, following the procedure described in the foregoing example, except that the reaction mixture was heated on the steam bath for seven hours, and on evaporation of the ether solution the unreacted phenol was recovered by distillation under reduced pressure. The distillation residue was dissolved in 95% ethanol (5 ml. per gram) and after decolorization with active carbon, the solution was cooled to about −20° C. to precipitate a small amount of by-products which were removed by filtration. On evaporation of the solvent from the filtrate, 13.6 g. of a reddish-brown, viscous liquid were obtained, which consisted essentially of a mixture of phenyl-9,10(10,9)-phenoxyhydroxystearate and 9,10(10,9)-phenoxyhydroxystearic acid.

Example IV

Beta-chloroallyl-9,10(10,9)-beta-chloroalloxyhydroxystearate was prepared by reacting 9,10-epoxystearic acid with beta-chloroallyl alcohol by the procedure described in Example I and using 4 ml. of the alcohol per gram of epoxystearic acid. After separation of the unreacted beta-chloroallyl alcohol by vacuum distillation, the residual reaction product was dissolved in ether, the ether solution washed with water until free of sulfuric acid, treated with activated carbon for one hour, filtered, and the ether then evaporated. The residue was an amber colored liquid, obtained in quantitative yield, which consisted essentially of beta-chloroallyl-9,10(10,9)-beta-chloroalloxyhydroxystearate.

Example V

Other ether-esters of 9-10-dihydroxystearic acid, formed by interaction of the corresponding alcohol with 9,10-epoxystearic acid, were prepared by the procedure described in Example I. The characteristics of some of these compounds are listed in the following table:

|  | Boiling Range | $n_D^{30}$ | $d_4^{30}$ | Saponification Equivalent |
|---|---|---|---|---|
| Ethyl-9,10(10,9)-ethoxyhydroxystearate | 160°–190° C./0.02–0.2 mm | 1.4479 | 0.9154 | 368.2 |
| n-Propyl-9,10(10,9)-n-propoxyhydroxystearate | 180°–184° C./0.02–0.04 mm | 1.4490 | 0.9099 | 399.5 |
| n-Butyl-9,10(10,9)-n-butoxyhydroxystearate | 185°–190° C./0.01 mm | 1.4498 | 0.9051 | 425.2 |
| iso-Butyl-9,10(10,9)-isobutoxyhydroxystearate | 172°–180° C./0.02–0.04 mm | 1.4471 | 0.8989 | 427.2 |
| Allyl-9,10(10,9)-alloxyhydroxystearate | 196°–202° C./0.35–0.5 mm | 1.4589 | 0.9266 | 387.5 |

The reaction may be conducted over a wide range of temperatures without affecting the results. Below 60° C., however, the reaction proceeds relatively slowly, and above about 150° C. in the presence of the acidic catalysts side reactions cause a reduction in yield of described product. The preferred operating range is 60 to 100 C. since the reaction proceeds rapidly, side reactions are at a minimum and good yields of ether-esters are obtained.

Having described my invention, I claim:

1. A compound of the general formula

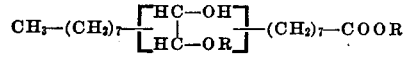

wherein R is an alkenyl radical.

2. The compound of claim 1 wherein R is an allyl radical.

3. The compound of claim 1 wherein R is allyl.

4. The compound of claim 1 wherein R is beta-chloroallyl.

DANIEL SWERN.

REFERENCES CITED

The following references are of record in the file of this patent:

Nicolet et al.: J. Am. Chem. Soc. 52, 1186–91 (1930).